(12) United States Patent
Moberg

(10) Patent No.: US 8,291,553 B2
(45) Date of Patent: Oct. 23, 2012

(54) TRIM PANEL HAVING A CLIP RETENTION FEATURE

(75) Inventor: Joshua Lewis Moberg, Milan, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 575 days.

(21) Appl. No.: 12/539,059

(22) Filed: Aug. 11, 2009

(65) Prior Publication Data

US 2011/0035909 A1    Feb. 17, 2011

(51) Int. Cl.
*F16B 5/06* (2006.01)
*F16B 21/09* (2006.01)
*B60R 13/00* (2006.01)
*B60J 9/00* (2006.01)

(52) U.S. Cl. ....... 24/297; 24/581.11; 24/458; 296/146.7
(58) Field of Classification Search ..................... 24/297, 24/457, 458, 581.11; 403/408.1, DIG. 14; 52/716.5, 506.05; 296/39.1, 146.7
See application file for complete search history.

(56) References Cited

U.S. PATENT DOCUMENTS

| | | | |
|---|---|---|---|
| 5,507,610 A * | 4/1996 | Benedetti et al. | 411/339 |
| 6,123,385 A | 9/2000 | Bailey et al. | |
| 6,254,302 B1 * | 7/2001 | Kraus | 403/326 |
| 6,594,870 B1 | 7/2003 | Lambrecht et al. | |
| 7,114,221 B2 | 10/2006 | Gibbons et al. | |
| 2004/0083583 A1 * | 5/2004 | Bradley et al. | 24/297 |

FOREIGN PATENT DOCUMENTS

| | | | |
|---|---|---|---|
| DE | 29900999 U1 * | 7/2000 | |
| JP | 11189105 A * | 7/1999 | |
| JP | 11198736 A * | 7/1999 | |

OTHER PUBLICATIONS

Co-pending U.S. Appl. No. 12/542,182, filed Aug. 17, 2009.

* cited by examiner

*Primary Examiner* — Robert J Sandy
(74) *Attorney, Agent, or Firm* — Gifford, Krass, Sprinkle, Anderson & Citkowski, P.C.

(57) ABSTRACT

A trim panel having a clip retention feature is provided. The trim panel is mounted to a support structure of an automotive vehicle by a clip. The clip includes a first flange at one end of the clip and a second flange spaced apart from the first flange. The trim panel includes an inner surface facing a passenger compartment of the automotive vehicle and an opposite outer surface facing the door. A housing having an attachment wall extends from the outer surface towards the door. The attachment wall includes an aperture and a slot extending from the aperture to an edge of the attachment wall for receiving the portion of a clip located between a first flange and second flange. A retention step extends from a bottom side of the attachment wall to restrain the clip within the attachment wall due to contact between an edge of the first flange and the retention step.

10 Claims, 3 Drawing Sheets

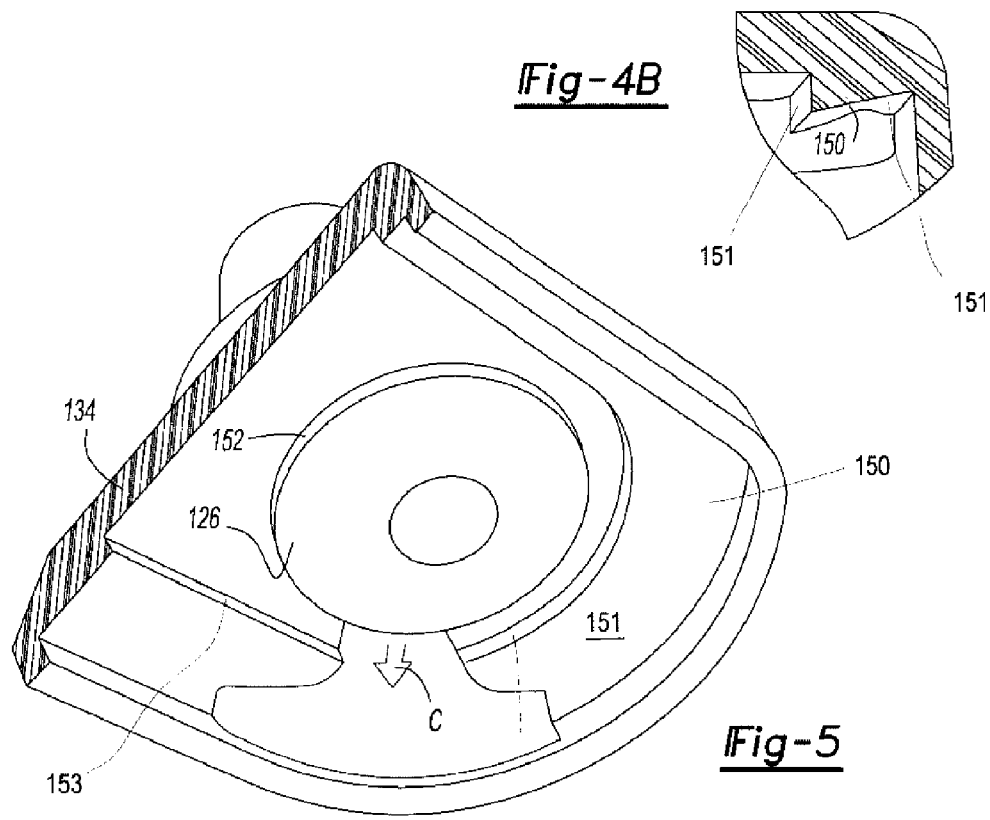
Fig-4B
Fig-5
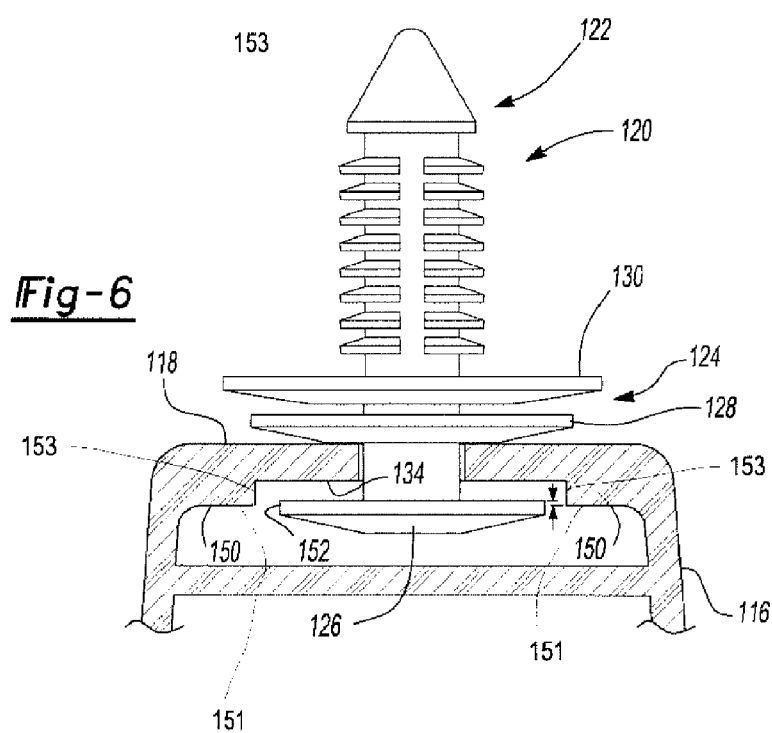
Fig-6

TRIM PANEL HAVING A CLIP RETENTION FEATURE

FIELD OF THE INVENTION

The present invention relates generally to a trim panel for a passenger compartment of an automotive vehicle and, in particular, to a trim panel having a clip retention feature.

BACKGROUND OF THE INVENTION

Most modern automotive vehicles utilize trim panels to provide an aesthetically pleasing appearance to the passenger compartment of the automotive vehicle. The trim panels are typically attached to a support structure of the automotive vehicle by a number of fasteners or clips strategically located on the trim panel. For ascetic reasons the clips are attached to an outer surface of the trim panel so that they are not visible to the occupants of tie passenger compartment.

The clips typically have an upper section for attaching to an opening in the support structure and a lower section for attaching to the trim panel. In order to increase the production efficiency during the assembly of the automotive vehicle, the trim panels have the lower section of the clips attached to the trim panel in advance of the installation of the trim panel to the support structure. The trim panels, with the clips previously installed, are usually stored in bulk on a shelf or other storage unit adjacent to the point in the assembly line where the trim panels are installed to tie automotive vehicle. By previously attaching the clips to the trim panels the installation time required to attach the trim panel is significantly reduced as all that is required is to select a trim panel from the storage unit and attach the trim panel to a support structure of the automotive vehicle via the clips.

However, problems arise when the clips detach from the trim panel prior to the installation of the trim panel to the support structure of the automotive vehicle. When the trim panel is removed from the storage unit the clips are liable to detach from the trim panel Production efficiency is reduced when a worker is required to locate any dislodged clips and reattach the clips to the trim panel prior to the installation of the trim panel to the support member.

It is known in the art to provide the trim panels with a retention feature to retain the clips to the trim panel prior to the installment of the trim panel to the support member. One such prior art retention feature is illustrated in FIGS. 1 and 2. A trim panel for an automotive vehicle is generally illustrated at 10. The trim panel 10 includes an inner surface 12 which faces the passenger compartment of the automotive vehicle, and an outer surface 14 facing the support structure of the automotive vehicle. The support structure includes an opening which is dimensioned to receive the upper section of the clip. The support structure is often the frame of the automotive vehicle or an additional panel or structure which is attached to the frame.

The trim panel 10 includes at least one housing 16 referred to as a "doghouse" attached to the outer surface 14. An attachment wall 18 of the housing 16 is provided to receive a clip 20. The clip 20 includes an upper section 22 for attaching to a corresponding opening located on the support structure, and a lower section for attaching to the attachment wall 18 of the trim panel 10.

The lower section 24 of the clip 20 includes a first flange 26 located at an end of the lower section 24. A second flange 28 spaced apart from the first flange 26 is also positioned on the lower section 24 of the clip 20. The first flange 26 is typically formed of a rigid material of sufficient thickness so as to restrain the position of the clip 20 in response to a force in the direction of arrow A. The second flange 28 along with a supplemental flange 30 are typically composed of a thin, flexible material which acts as a skirt or seal to prevent moisture or other contaminants from contacting the trim panel by sealing the opening of the support structure.

The attachment wall 18 includes a keyed aperture 30 for receiving a portion of the lower section 24 of the clip 20 between the first flange 26 and the second flange 28. As stated above, the clip 20 is restrained within the housing 16 in the direction of arrow A due to the contact between the first flange 26 and a bottom surface 34 of the attachment wall 18.

The clip 20 includes a retention feature disposed on a top side 36 of the attachment wall 18, in the form of a pair of retention bumps 38. The clip 20 is retained within the keyed aperture 32, in response to a force acting on the clip in the direction of arrow B, due to the contact between the second flange 28 and the pair of retention bumps 38.

However, as the second flange 28 is formed of a thin, flexible material the second flange 28 is susceptible to deflecting upon contact with the retention bumps 38. This allows the clip 20 to be dislodged from the keyed aperture 32 when a force in the direction of arrow B is applied to the clip 20. As stated above, the dislodgement of the clip 20 from the keyed aperture 32 results in a decrease in production efficiency as a worker is required to locate, retrieve, and reattach the clip 20 to the housing 16 before installing the trim panel 10 to the support member.

As such, the currently used retention bumps are unreliable and offer poor clip-retaining abilities. Thus, there exists a need for an improved trim panel having a reliable clip retention feature to retain a clip to the trim panel prior to the insertion of the trim panel to a support structure.

SUMMARY OF THE INVENTION

The present invention provides an improved trim panel which overcomes the above-mentioned disadvantages of the previously known trim panels having clip retention features.

In brief, a trim panel for mounting to a support structure of an automotive vehicle is provided. The trim panel includes an inner surface facing an interior of the automotive vehicle and an opposite outer surface facing the support structure. A clip for securing the trim panel to the support structure includes an upper section for attaching to the support structure and lower section for attaching to the trim panel. The lower section of the clip includes a first flange extending radially from one end, and a second flange spaced apart from the first flange.

A housing having an attachment wall extends from the outer surface of the trim panel towards the support structure. The attachment wall includes an aperture formed therethrough and a slot extending from the aperture to an edge of the attachment wall. The aperture and slot are dimensioned to receive a portion of the lower section of a clip between the first flange and the second flange.

The housing includes a retention feature extending from a bottom side of the attachment wall to retain the clip within the aperture through contact between the first flange and the retention feature. The retention feature is formed as a step extending from a bottom side of the attachment wall. By providing the retention feature on the bottom side of the attachment wall, the retention feature abuts the first flange formed of a rigid material to provide reliable clip retention.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which:

FIG. 4B is a partial cross-sectional view of the housing illustrating an angled retention step;

FIG. 5 is a bottom perspective view illustrating the engagement of a clip with the trim panel of the present invention; and FIG. 6 is a cross-sectional view illustrating the clip when inserted into the trim panel of the present invention.

DETAILED DESCRIPTION OF A PREFERRED EMBODIMENT OF THE PRESENT INVENTION

The present invention has utility as a trim panel having a clip retention feature which overcomes the above-mentioned disadvantages. The inventive trim panel provides a worker with a reliable clip retention feature that maintains the attachment of the clip to the trim panel prior to the installation of the trim panel to a support structure of an automotive vehicle. Further, the detachment of the clip due to the defection of a thin, flexible flange over the retention feature is diminished by providing a retention feature which contacts a thicker, rigid flange to maintain the attachment of the clip to the trim panel.

Figure 1:
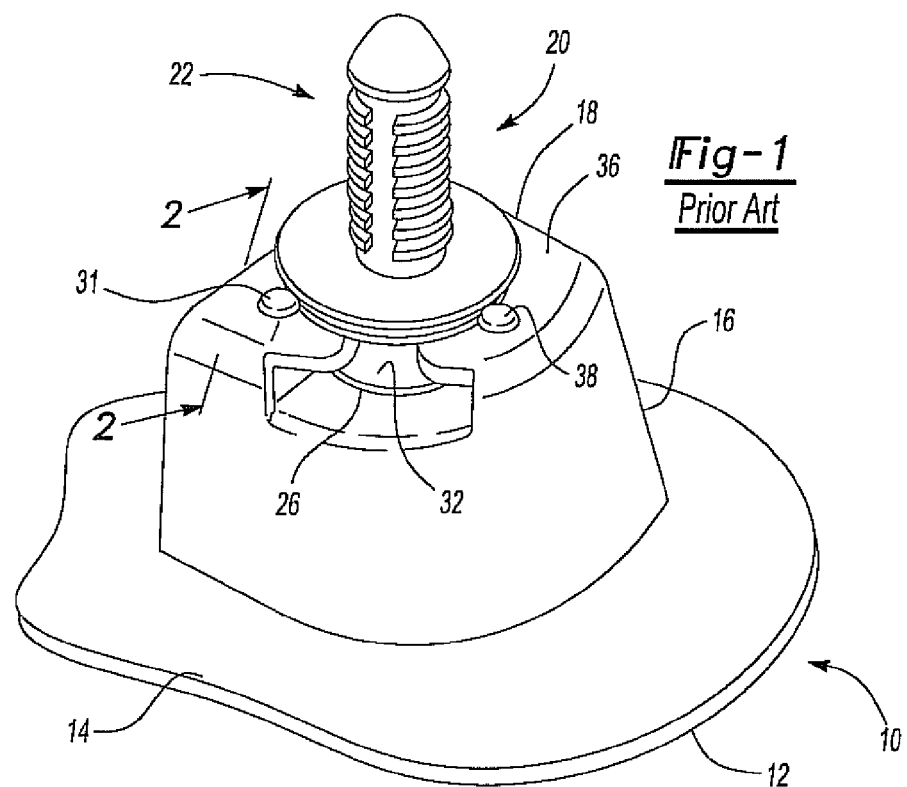
FIG. 1 is a front perspective view illustrating a trim panel having a prior art clip retention feature.
Figure 2:
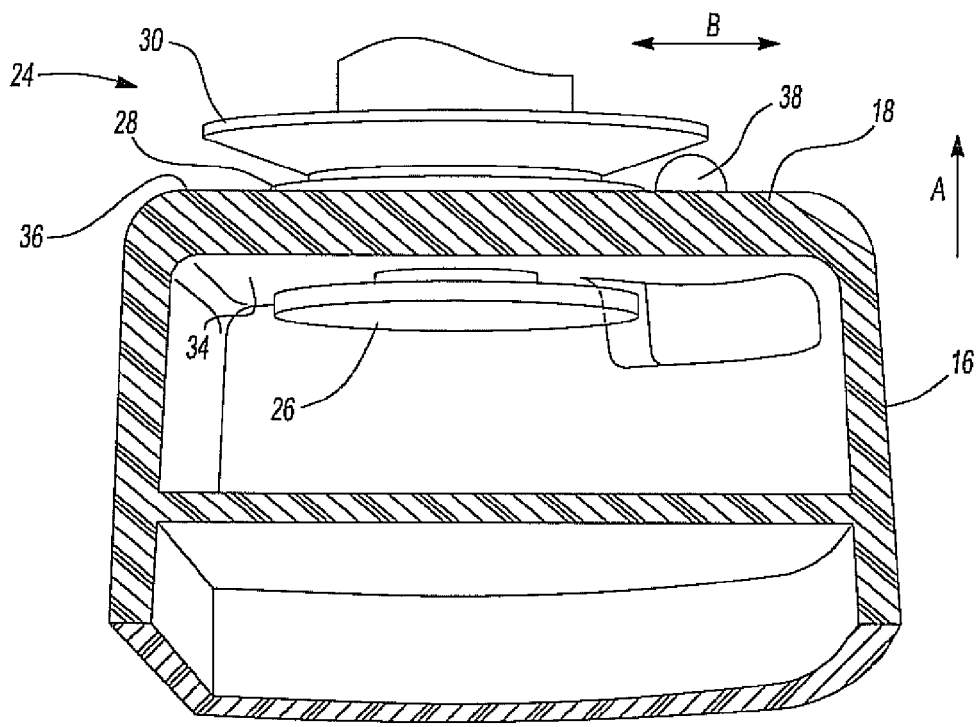
FIG. 2 is a partial cross-sectional view taken along the line 2-2 of FIG. 1 which illustrates the prior art clip retention feature.
Figure 3:
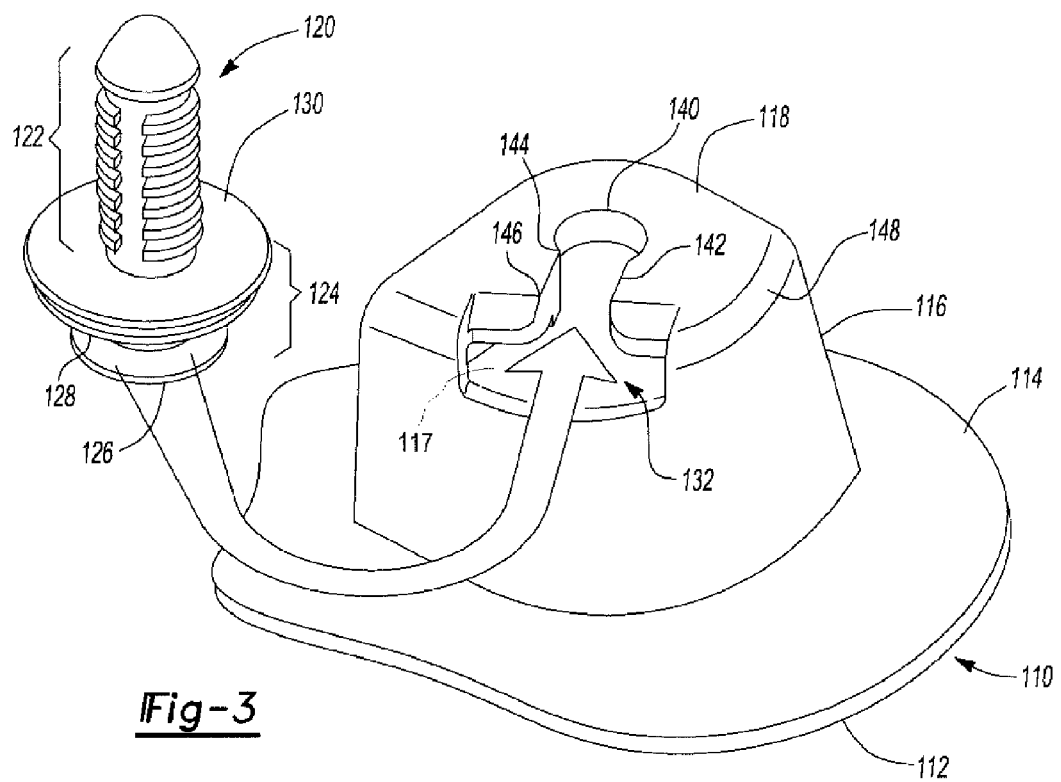
FIG. 3 is a front perspective view illustrating the interaction of a clip with the trim panel of the present invention.
Figure 4A:
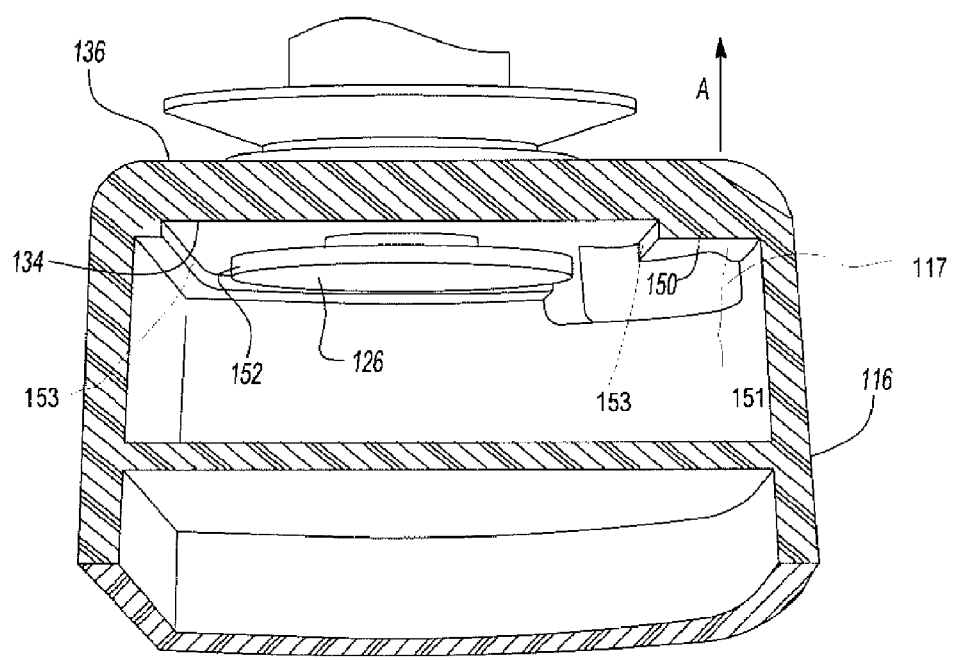
FIG. 4A is a partial cross-sectional view of the housing of FIG. 3 which illustrates the trim panel of the present invention.

With reference to FIGS. 3 and 4A, the inventive trim panel is generally illustrated at 110. The trim panel 110 is attached to various locations in the interior of an automotive vehicle, illustratively including but not limited to a door, rear hatch or side wall, to provide an ascetically pleasing appearance to the passenger compartment. The trim panel 110 includes an inner surface 112 which faces the passenger compartment of the automotive vehicle and an outer surface 114 which faces a support structure. The support structure is often the frame of the automotive vehicle or an additional panel or structure attached to the frame. The support structure includes an opening for receiving a portion of the clip.

At least one housing 116 referred to as a "doghouse" is positioned on the trim panel. The housing 116 extends from the outer surface 114 of the trim panel 110 towards the support structure. The housing 116 includes a window 117 and an attachment wall 118 having a keyed aperture 132 for receiving a portion of a clip 120. The attachment wall 118 being formed above the window 117.

A clip 120 is used to attach the trim panel 110 to the support structure of the automotive vehicle. The clip 120 includes an upper section 122 which snap fits, or frictionally engages with the opening located on the support structure, and a lower section 124 which attaches to the trim panel 110 via the attachment wall 118 and the housing 116. The lower section 124 includes a radially extending first flange 126 at one end of the lower section 124 and a radially extending second flange 128 spaced apart from the first flange 126. A supplemental flange 130 is optionally provided above the second flange 128. The window 117 is formed having a width that is wider than a width of the first flange 126.

The first flange is typically made of a relatively thick or rigid material so as to restrain the clip 120 within the keyed aperture in response to a force in the direction of arrow A due to the contact between the first flange 126 and the attachment wall 118. The second flange 128 is typically made of a thin, flexible material and is used in conjunction with the supplemental flange 130 to seal the opening in which the upper section 122 of the clip 120 inserts into the support member, thereby preventing moisture and other contaminants from contacting the trim panel.

The keyed aperture 132 is formed of an aperture 140 and a slot 142 having a proximate end 144 adjacent the aperture 140 and a distal end 146 adjacent an edge 148 of the attachment wall 118. The slot 142 is dimensioned so as have a width that is less than the width of the window 117 and to allow a portion of the lower section 124 of the clip 120 between a first flange 126 and a second flange 128, known as the clip body, to snap fit into the aperture 140. The attachment wall 118 includes ramps 154 adjacent each side of the slot 142. The ramps 154 have an inclined surface tapering towards the edge 148 of the attachment wall 118 so as to facilitate insertion of the clip 120 into the keyed aperture 132.

As discussed above, the retention of the clip 120 within the attachment wall 118 is a major concern affecting production efficiency during the installation of the trim panel 110 to the support structure of the automotive vehicle. As such, the inventive trim panel 110 is provided with a retention feature in the form of a retention step 150 which extends from a bottom surface or side 134 of the attachment wall 118 and extends toward the outer surface 114 of the trim panel 110. The retention step 150 includes a distal surface 151 and a side edge 153.

The retention step 150 extends from the bottom side 134 of the attachment wall 118 in a direction generally aligned with longitudinal direction of the clip 120 such that the distal surface 151 is spaced apart from the bottom surface 134 and the side edge 153 extends between the bottom surface 134 and the distal surface 151. The side edge 153 of the retention step 150 provides a flat surface for contacting the first flange 126 to retain the clip 120 within the attachment wall 118. The side edge 153 of the retention step 150 is spaced apart a predetermined distance from the edge 148 of the attachment wall 118. As seen in FIG. 4A, the retention step 150 extends to the edge 148 in a uniform thickness which allows a portion of the lower section 124, between first flange 126 and second flange 128, to pass the retention step 150 by slightly deforming the first flange 126 and the second flange 128 to accommodate the thickness of the retention step 150. The retention step 150 is provided on a portion of the attachment wall 118 that is adjacent to the window 117 and the slot 142.

Once inserted, the second flange 128 will rest on the top side 136 of the attachment wall 118, thereby supporting the clip 120 within the housing 116. As seen in FIG. 6, a portion of the first flange 126 will align with a portion of the side edge 153 of the retention step 150 even when the clip 120 is fully seated in the attachment wall 118.

In the illustrated embodiment, the retention step 150 extends from the bottom side 134 of the attachment wall 118, along the entire edge 148 as a continuous step. Further, the retention step 150 at least partially surrounds the first flange 126 and has a shape which is complementary to the shape of the first flange 126. However, it is appreciated that the retention step is optionally formed only adjacent the edge 148 on either side of the distal end 146 of the slot 142.

As seen in FIG. 4B, in order to facilitate the insertion of the clip 120, the retention step 150 is optionally angled so that the retention step 150 is thinner adjacent the edge 148 of the attachment wall 118 and becomes progressively thicker. The angled orientation of the retention step 150 still provides the side edge 153 for contacting the first flange 126, and allows for easier installation of the clip 120 into the attachment wall 118.

With reference to FIG. 5, upon movement of the clip 120 in the direction of arrow C, a portion of side 152 of the first flange 126 will abut the side edge 153 of the retention step 150 to halt the movement of the clip 120 thereby retaining the clip 120 within the attachment wall 118. As the first flange 126 is formed of a rigid material or of a sufficient thickness to avoid deflection, the contact between the side edge 152 of the first flange 126 and the side edge 153 of the retention step 150 provides reliable retention of clip 120 within the attachment wall 118.

The retention step 150 is attached to the bottom side 134 of the attachment wall 118 by any means known to those of ordinary skill in the art illustratively including adhesive or welding. In the alternative, the retention step 150 is formed integrally with the attachment wall 118 by recessing a portion of the bottom side 134 such that retention step 150 has a thickness greater than the thickness of the remaining portion of the attachment wall 118.

From the foregoing, it can be seen that the present invention provides reliable clip retention through the contact between a sufficiently rigid or thick flange located at the end of a lower section of a clip and a retention feature extending from the bottom side of the attachment wall. Having described the invention, however, many modifications thereto will become apparent to those skilled in the art to which it pertains without deviation from the spirit of the invention as defined by the scope of the appended claims.

The invention claimed is:

1. A trim panel for mounting to a support structure of an automotive vehicle by a clip having a first flange at one end of the clip and a second flange spaced apart from the first flange, and a clip body defined as the portion of the clip between the first flange and the second flange, said trim panel comprising:
    an inner surface facing an interior of the vehicle and an opposite outer surface facing the support structure; and
    a housing extending from said outer surface, said housing having a window and an attachment wall formed above said window, said window having a width greater than a width of the first flange of the clip,
    said attachment wall having an aperture extending between an upper surface and an opposite bottom surface of said attachment wall and a slot formed in said attachment wall to connect said window with said aperture for receiving the clip body, said slot having a width that is less than said width of said window; and
    wherein a portion of said attachment wall adjacent said slot and said window includes a retention step extending from said bottom surface, said retention step having a distal surface and a side edge extending between said bottom surface of said attachment wall and said distal surface, said distal surface being spaced apart from said bottom surface of the attachment wall;
    wherein upon insertion of the clip body into said aperture, said side edge of said retention step provides an abutment to a side of the first flange to retain the clip body within said aperture.

2. The trim panel of claim 1, wherein a portion of said bottom surface of said attachment wall is recessed to form said retention step.

3. The trim panel of claim 1, wherein a portion of a top side of said attachment wall adjacent said slot is slanted to facilitate insertion of the clip.

4. The trim panel of claim 1, wherein said retention step is angled so as to facilitate insertion of the clip.

5. The trim panel of claim 1, wherein said slot is tapered so that a distal end of said slot adjacent said window is wider than a proximate edge of the slot adjacent said aperture.

6. A trim panel assembly for mounting to a support structure of an automotive vehicle comprising:
    a trim panel having an inner surface facing an interior of the vehicle and an opposite outer surface facing said support structure;
    a clip having an upper section for attaching to the support structure and a lower section for attaching to said trim panel, said lower section having a first flange at a one end and a second flange spaced apart from said first flange, and a clip body defined as the portion of said clip between said first flange and said second flange; and
    a housing extending from said outer surface, said housing having a window and an attachment wall formed above said window, said window having a width greater than a width of the first flange of the clip, said attachment wall having an aperture extending between an upper surface and an opposite bottom surface of said attachment wall, and a slot formed in said attachment wall to connect said window with said aperture for receiving said clip body, said slot having a width that is less than said width of said window; and
    wherein a portion of said attachment wall adjacent said slot and said window includes a retention step extending from a bottom surface of said attachment wall, said retention step having a distal surface and a side edge extending between said bottom surface of said attachment wall and said distal surface, said distal surface being spaced apart from said bottom surface of said attachment wall, and wherein upon insertion of the clip body into said aperture, said side edge of said retention step provides an abutment to a side of said first flange to retain said clip body within said aperture.

7. The trim panel assembly of claim 6, wherein a portion of said bottom surface of said attachment wall is recessed to form said retention step.

8. The trim panel assembly of claim 6, wherein a portion of a top side of said attachment wall adjacent said slot is slanted to facilitate insertion of said clip.

9. The trim panel assembly of claim 6, wherein said retention step is angled so as to facilitate insertion of said clip.

10. The trim panel assembly of claim 6, wherein said slot is tapered so that a distal end of said slot adjacent said window is wider than a proximate end of said slot adjacent said aperture.

* * * * *

UNITED STATES PATENT AND TRADEMARK OFFICE
CERTIFICATE OF CORRECTION

| | | |
|---|---|---|
| PATENT NO. | : 8,291,553 B2 | Page 1 of 1 |
| APPLICATION NO. | : 12/539059 | |
| DATED | : October 23, 2012 | |
| INVENTOR(S) | : Joshua Lewis Moberg | |

It is certified that error appears in the above-identified patent and that said Letters Patent is hereby corrected as shown below:

In the specification

At column 1, line number 19, Delete "tie", Insert --the--

At column 1, line number 29, Delete "tie", Insert --the--

At column 1, line number 39, after panel, Insert --.--.

Signed and Sealed this
Twenty-first Day of April, 2015

Michelle K. Lee
*Director of the United States Patent and Trademark Office*